(12) United States Patent
Tsuie et al.

(10) Patent No.: US 6,908,972 B2
(45) Date of Patent: Jun. 21, 2005

(54) METHOD FOR MAKING POLYOLEFINS

(75) Inventors: Barbara M. Tsuie, West Chester, OH (US); Karen L. Neal-Hawkins, Cincinnati, OH (US); Sandor Nagy, Naperville, IL (US); Michael W. Lynch, West Chester, OH (US); Mark P. Mack, West Chester, OH (US); Shaotian Wang, Mason, OH (US); Jean A Merrick-Mack, West Chester, OH (US); Clifford C. Lee, Cincinnati, OH (US); Joel A. Mutchler, Morris, IL (US); Kenneth W. Johnson, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 66 days.

(21) Appl. No.: 10/123,774

(22) Filed: Apr. 16, 2002

(65) Prior Publication Data
US 2003/0195306 A1 Oct. 16, 2003

(51) Int. Cl.$^7$ .................................................. C08F 4/52
(52) U.S. Cl. ...................... 526/160; 526/153; 526/172; 526/130; 526/348; 526/348.2
(58) Field of Search ............................... 526/161, 172, 526/943, 905, 126, 130, 134

(56) References Cited

U.S. PATENT DOCUMENTS

| | | | |
|---|---|---|---|
| 4,752,597 A | 6/1988 | Turner | 502/104 |
| 4,791,180 A | 12/1988 | Turner | 526/160 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,539,124 A | 7/1996 | Etherton et al. | 548/402 |
| 5,554,775 A | 9/1996 | Krishnamurti et al. | 556/7 |
| 5,637,659 A | 6/1997 | Krishnamurti et al. | 526/133 |
| 5,637,660 A | 6/1997 | Nagy et al. | 526/160 |
| 5,648,440 A | 7/1997 | Sugano et al. | 526/132 |
| 5,902,866 A | 5/1999 | Nagy et al. | 526/133 |
| 6,211,311 B1 | 4/2001 | Wang et al. | 526/131 |
| 6,232,260 B1 * | 5/2001 | Nagy et al. | 502/155 |
| 6,376,629 B2 * | 4/2002 | Nagy et al. | 526/161 |
| 6,414,162 B1 * | 7/2002 | Nagy | 548/406 |
| 6,541,583 B2 * | 4/2003 | Meverden et al. | 526/127 |
| 6,559,251 B1 * | 5/2003 | Wang et al. | 526/127 |
| 6,583,242 B2 * | 6/2003 | Wang et al. | 526/161 |
| 2001/0056161 A1 * | 12/2001 | Wang et al. | 526/160 |
| 2002/0193535 A1 * | 12/2002 | Meverden et al. | 526/127 |
| 2003/0004052 A1 * | 1/2003 | Lynch et al. | 502/117 |

FOREIGN PATENT DOCUMENTS

WO    WO 99/24446    5/1999

OTHER PUBLICATIONS

N. Buu–Hoi et al., *J. Chem. Soc.* (1952) 2225.
R.N. Shroff et al., "Long–Chain–Branching Index For Essentially Linear Polyethylenes," *Macromolecules, vol. 32* (25), pp. 8454–8464 (1999).

* cited by examiner

*Primary Examiner*—David W. Wu
*Assistant Examiner*—Rip A Lee
(74) *Attorney, Agent, or Firm*—Jonathan L. Schuchardt

(57) ABSTRACT

A method for making ethylene polymers and copolymers is disclosed. The method uses a catalyst system comprising a low level of an aluminum-containing activator, a bridged indenoindolyl transition metal complex, and a treated silica support. The method enables economical preparation of ethylene copolymers having very low density. The silica-supported, bridged complexes incorporate comonomers efficiently and are valuable for a commercial slurry loop process. Use of a bridged indeno[2,1-b]indolyl complex provides exceptionally efficient comonomer incorporation, and gives polymers with a substantial and controlled level of long-chain branching. The method facilitates the production of a wide variety of polyolefins, from HDPE to plastomers.

29 Claims, No Drawings

METHOD FOR MAKING POLYOLEFINS

FIELD OF THE INVENTION

The invention relates to a method for making polyolefins. In particular, the invention provides an efficient way to make linear low density and plastomeric olefin copolymers, as well as olefin polymers having improved processability.

BACKGROUND OF THE INVENTION

Most olefin polymers are currently manufactured using Ziegler-Natta catalysts, but single-site (metallocene and non-metallocene) catalysts represent the industry's future. Single-site catalysts can produce polymers with valuable physical properties such as narrow molecular weight distribution, reduced low molecular weight extractables, and modified melt rheology and relaxation characteristics. Traditional metallocenes incorporate cyclopentadienyl (Cp) ligands, as in bis(cyclopentadienyl)zirconium dichloride, but a variety of other "Cp-like" ligands have been used, including indenyl, fluorenyl, and substituted varieties of these.

Single-site catalysts that incorporate a transition metal and at least one "indenoindolyl" ligand are known. For example, U.S. Pat. No. 6,232,260 teaches the use of indenoindolyl Group 3–10 metal complexes as catalysts for polymerizing olefins. The examples illustrate the use of a non-bridged bis(indenoindolyl)zirconium complex for making high-density polyethylene. The '260 patent generally teaches that comonomers can be used in the polymerizations, that the complexes can be supported, and that the indenoindolyl ligand can be bridged to another ligand. The examples, however, are limited to unsupported, non-bridged complexes, so little is revealed about any advantages of using supported or bridged complexes. In fact, the non-bridged complexes have important limitations with respect to comonomer incorporation. We found that even with high levels of comonomer, it is difficult to push polymer densities below about 0.915 g/cm$^3$ when a non-bridged indenoindolyl complex is used.

PCT Int. Appl. WO 99/24446 (Nifant'ev et al.) teaches metallocene complexes that incorporate a Group 3–6 transition metal and an indenoindolyl ligand. In many of the complexes, the indenoindolyl group is bridged to another ligand, which is often a second indenoindolyl ligand. The indene and indole rings are fused together in "[1,2-b]" or "[2,1-b]" orientation. (In the [1,2-b] ring system, the nitrogen of the indole ring is on the opposite side of the molecule from the methylene group of the indene ring; in the [2,1-b] ring system, the indole nitrogen and the indene methylene are on the same side of the molecule. Compare complexes 6 and 15 below).

Nifant'ev provides many examples of how to make bridged ligands and transition metal complexes that incorporate the ligands. The complexes are used to make high-density polyethylene (HDPE), linear low density polyethylene (LLDPE) having densities greater than 0.9 g/cm$^3$, ethylene-propylene copolymers, and polypropylene. Nifant'ev uses only unsupported complexes, which have limited applicability for commercial processes such as the "slurry loop" process. Moreover, Nifant'ev teaches to use the unsupported catalysts with a high molar ratio of aluminum to transition metal, typically 1000–8000, for favorable activity. Unfortunately, the aluminum cocatalyst, because it is used in such a large excess, is often the most expensive catalyst component.

Still needed are commercially viable ways to make polyolefins using single-site catalysts. Preferably, the catalysts would incorporate an indenoindolyl ligand, which can be tailored with substituent variations to control catalyst activity and important polymer attributes such as melt index and molecular weight distribution. A preferred process would incorporate comonomers efficiently, thereby enabling the production of very low density polyolefins. Ideally, polyolefins with a wide range of densities from HDPE, to LLDPE, to very low density polyethylene and plastomers, could be made. Preferably, the process would provide access to ultra-high molecular weight LLDPE (i.e., Mw>200,000) having densities less than about 0.91. An ideal process would also allow polyolefin makers to control processability by regulating the amount of long-chain branching in the polymers. A valuable process would use a supported catalyst with commercial applicability to the slurry loop process, and would be active enough to use at low aluminum to transition metal ratios (i.e., less than 500 moles Al/mole transition metal).

SUMMARY OF THE INVENTION

The invention is a method for making ethylene copolymers having densities less than 0.930 g/cm$^3$. The method comprises polymerizing ethylene and a 1-olefin in the presence of a catalyst system comprising an aluminum-containing activator, a bridged indenoindolyl Group 3–10 transition metal complex, and a treated silica support. The catalyst system uses a low level of aluminum-containing activator. The aluminum to transition metal [Al/M] molar ratio is less than 500, typically about 200 or less. The method enables economical preparation of ethylene copolymers having very low density. The silica-supported, bridged complexes incorporate comonomers efficiently and are valuable for a commercial slurry loop process.

In one aspect of the invention, a silica-supported, bridged indeno[2,1-b]indolyl complex is used to produce ethylene homopolymers or copolymers having substantial long-chain branching (LCBI>0.2). The ability to control long-chain branching in polyolefins provides an important handle for improving processability, a key issue for single-site polyolefins. We surprisingly found that the [2,1-b] complexes are exceptionally efficient at incorporating comonomers, which facilitates the production of LLDPE and plastomers having densities less than 0.900 g/cm$^3$.

Finally, the invention also provides a way to make linear low density polyethylenes having "ultra-high" molecular weights (i.e., Mw>200,000).

DETAILED DESCRIPTION OF THE INVENTION

The method of the invention uses a catalyst system that comprises an aluminum-containing activator, an organometallic complex, and a treated silica support. The complex includes a Group 3 to 10 transition metal, M. As used herein, "transition metal" includes metals of the lanthanide and actinide series. More preferred complexes include a Group 4 to 6 transition metal; most preferably, the complex contains a Group 4 metal such as titanium or zirconium.

The complex includes at least one anionic "indenoindolyl" ligand that is bridged to another ligand. Indenoindolyl ligands are generated by deprotonating an indenoindole compound using a potent base. By "indenoindole compound," we mean an organic compound that has both indole and indene rings. The five-membered rings from each are fused, i.e., they share two carbon atoms. Preferably, the rings are fused such that the indole nitrogen and the only sp³-hybridized carbon on the indenyl ring are "trans" to each other. Such is the case in an indeno[1,2-b] ring system such as:

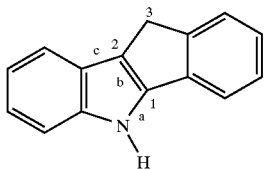

Suitable ring systems also include those in which the indole nitrogen and the sp³-hybridized carbon of the indene are beta to each other, i.e., they are on the same side of the molecule. This is an indeno[2,1-b]indole ring system:

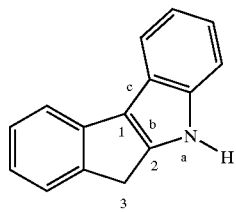

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

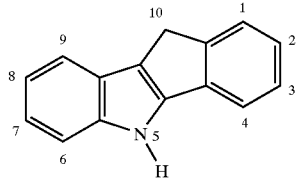

while 5,6-dihydroindeno[2,1-b]indole has the numbering:

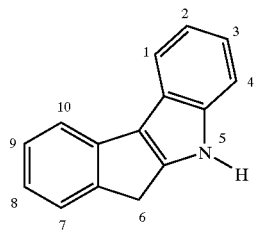

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appl. WO 99/24446. Examples 1(a) and 3(a) below illustrate, respectively, the preparation of an indeno[1,2-b] indole and an indeno[2,1-b]indole.

The indenoindolyl ligand is bridged to another anionic ligand, and both moieties coordinate to the transition metal. Preferably, the other ligand is a second indenoindolyl ligand or a polymerization-stable anionic ligand. Suitable polymerization-stable ligands include, for example, substituted and unsubstituted cyclopentadienyl, fluorenyl, and indenyl, or the like, such as those described in U.S. Pat. Nos. 4,791,180 and 4,752,597, the teachings of which are incorporated herein by reference. Suitable polymerization-stable ligands include heteroatomic ligands such as boraaryl, pyrrolyl, indolyl, quinolinoxy, pyridinoxy, and azaborolinyl as described in U.S. Pat. Nos. 5,554,775, 5,539,124, 5,637,660, and 5,902,866, the teachings of which are incorporated herein by reference.

A divalent bridging group covalently connects the indenoindolyl ligand and the polymerization-stable ligand. Suitable bridging groups are well known. Many are described in WO 99/24446. They include, for example, dialkylsilyl, diarylsilyl, ethylidene, isopropylidene, methylene, dimethylene, 1,2-diphenylene, 1,4-diphenylene, and the like. Particularly preferred are methylene, dimethylene, isopropylidene, and dimethylsilyl.

The bridged ligands are produced using well-known methods. In a typical synthesis, an indenoindole compound is first prepared and N-alkylated. Deprotonation and displacement reactions are used to attach a bridging group and then the polymerization-stable ligand. Example 1 below shows a typical strategy. An indeno[1,2-b]indole is prepared by reacting 1-indanone and p-tolylhydrazine hydrochloride to give 1. N-methylation gives 2. Reaction with n-butyllithium generates an indenoindolyl monoanion (3), which reacts with dichlorodimethylsilane to give 4. Finally, halide displacement with cyclopentadienyl sodium generates the bridged ligand.

To generate the complex, the bridged ligand is first deprotonated with at least two equivalents of a potent base such as lithium diisopropylamide, n-butyllithium, sodium hydride, a Grignard reagent, or the like. The resulting dianion reacts with a Group 3 to 10 transition or lanthanide metal source to produce the organometallic complex. Any convenient source of the Group 3 to 10 transition or lanthanide metal can be used. Usually, the source is a complex that contains one or more labile ligands that are easily displaced by the dianion. Examples are halides (e.g., $TiCl_4$, $ZrCl_4$), alkoxides, amides, and the like.

In Example 1, below, the bridged ligand is first reacted with two equivalents of n-butyllithium to generate a dianion (5). Addition of zirconium tetrachloride gives the desired complex, 6. A similar strategy is employed to generate other suitable bridged ligands and complexes. For additional suitable synthetic approaches to the bridged ligands and complexes, see WO 99/24446.

In addition to the bridged indenoindolyl ligand, the organometallic complex usually includes one or more labile anionic ligands such as halides, alkoxys, aryloxys, alkyls, alkaryls, aryls, dialkylaminos, or the like. Particularly preferred are halides, alkyls, and alkaryls (e.g., chloride, methyl, benzyl).

An aluminum-containing activator, which may be used in combination with another activator, is required. Suitable aluminum-containing activators help to ionize the organometallic complex and activate the catalyst. They are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable aluminum-containing activators also include aluminoboronates—reaction products of alkyl aluminum compounds and organoboronic acids—as described in U.S. Pat. Nos. 5,414,180 and 5,648,440, the teachings of which are incorporated herein by reference.

The aluminum-containing activator can be used in combination with another activator. The other activator can be an acid salt that contains a non-nucleophilic anion. These compounds generally consist of bulky ligands attached to boron or aluminum. Examples include lithium tetrakis(pentafluorophenyl)borate, lithium tetrakis(pentafluorophenyl)-aluminate, anilinium tetrakis(pentafluorophenyl)borate, and the like. Suitable other activators also include organoboranes, which include boron and one or more alkyl, aryl, or aralkyl groups. Particularly preferred are substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference.

The optimum amount of aluminum-containing activator needed relative to the amount of organometallic complex depends on many factors, including the nature of the complex and activator, the kind of support used, the desired reaction rate, the kind of polyolefin product, the reaction conditions, and other factors. However, an advantage of the invention is that less than about 500 moles of aluminum per mole of transition metal, M, is used. Preferably, the aluminum-containing activator is used in an amount within the range of about 10 to about 250 moles of aluminum per mole of M. The activator is preferably deposited onto the support along with the organometallic complex. If desired, however, it can be added to the reactor apart from the supported complex.

A treated silica support is required. Many commercially available silicas, such as those available from Davison (e.g., "948") or Crossfield (e.g., "ES 757") are suitable for use. Preferably, the silica has a surface area in the range of about 10 to about 700 m$^2$/g, an average particle size in the range of about 1 to about 500 microns, and a pore volume in the range of about 0.1 to about 5 mL/g.

The silica is treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. In a preferred approach, calcined silica is treated with an alumoxane and stripped to give an alumoxane-treated silica. This product is then combined with the transition metal complex and any additional activator (see Example 12 below).

The complex and activator can be deposited on the support in any desired manner. For instance, the components can be dissolved in a solvent, combined with a support, and stripped. Alternatively, an incipient-wetness technique can be used. Moreover, the support can simply be introduced into the reactor separately from the complex and activator.

The loading of complex on the support varies depending upon a number of factors, including the identities of the complex and the support, the type of olefin polymerization process used, the reaction conditions, and other concerns. Usually, the amount of complex used is within the range of about 0.01 to about 10 wt. % of transition metal based on the amount of supported catalyst. A more preferred range is from about 0.1 to about 4 wt. %.

Ethylene and 1-olefins are polymerized in the method of the invention. Preferred 1-olefins are $C_3$–$C_{20}$ 1-olefins such as propylene, 1-butene, 1-hexene, 1-octene, and the like. Mixtures of olefins can be used. Ethylene or mixtures of ethylene with $C_3$–$C_{10}$ 1-olefins are especially preferred. The ratio of ethylene to the α-olefin used depends on the desired polymer density. A 1-olefin/ethylene mole ratio of greater than about 0.3 is preferably used to make very low density polyethylenes.

Many types of olefin polymerization processes can be used. Preferably, the process is practiced in the liquid phase, which can include slurry, solution, suspension, or bulk processes, or a combination of these. High-pressure fluid-phase or gas-phase techniques can also be used. The process of the invention is particularly valuable for gas-phase and slurry processes. Suitable methods for polymerizing olefins using the catalysts of the invention are described, for example, in U.S. Pat. Nos. 5,902,866, 5,637,659, and 5,539,124, the teachings of which are incorporated herein by reference.

The olefin polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The invention enables the preparation of ethylene copolymers having very low densities. Generally, the copolymers can have densities less than about 0.930 g/cm$^3$. If desired, the density can be depressed to much lower values, i.e., less than 0.910 g/cm$^3$, and even less than 0.900 g/cm$^3$. In a preferred method of the invention, a bridged, indeno[2,1-b]indolyl complex is used to make copolymers having densities less than 0.910 g/cm$^3$ (see Examples 17 and 18). Ethylene-hexene copolymers of such low density are not easily accessible when a non-bridged indenoindolyl complex is used (see Comparative Example 25).

Ethylene polymers and copolymers made by the method of the invention generally have narrow molecular weight distributions, i.e., they usually have Mw/Mn values less than about 4. Polymers with very narrow molecular weight distributions can be made by using triethylaluminum as a scavenger (see Example 16). Complex selection also makes a difference. Note the narrow molecular weight distribution produced with the isopropylidene bridging group (Example 21).

The invention provides a valuable way to improve polymer processability by controlling the amount of long-chain branching in the polymer. The "long-chain-branching index"

or LCBI, is a rheological index used to characterize low levels of long-chain branching in essentially linear polyethylenes. LCBI is defined as:

$$LCBI = \frac{\eta_0^{0.179}}{4.8 \cdot [\eta]} - 1$$

where $\eta_0$ is the limiting, zero-shear viscosity (Poise) at 190° C. and $[\eta]$ is the intrinsic viscosity in trichlorobenzene at 135° C.(dL/g). LCBI is based on observations that low levels of long-chain branching, in an otherwise linear polymer, result in a large increase in melt viscosity, $\eta_0$, with no change in intrinsic viscosity, $[\eta]$. See R. N. Shroff and H. Mavridis, "Long-Chain-Branching Index for Essentially Linear Polyethylenes," *Macromolecules*, Vol. 32 (25), pp. 8454–8464 (1999). A higher LCBI means a greater number of long-chain branches per polymer chain.

Interestingly, we found that indeno[1,2-b]indolyl complexes give polyethylenes with little or no long-chain branching (see Examples 14–16), but when an indeno[2,1-b]indolyl complex is used, the polymer surprisingly has substantial levels of long-chain branching (see Examples 17 and 18). Moreover, the presence of long-chain branching in polymers made using indeno[2,1-b]indolyl complexes appears to be independent of density. Examples 22–24 illustrate the preparation of HDPE, LLDPE, and plastomers having substantial levels of long-chain branching (LCBI>0.2), each of which is made with a [2,1-b] complex. As the examples demonstrate, it is possible to make polymers having an LCBI greater than 0.5, and even greater than 1.0 using a [2,1-b] complex in the method of the invention.

The following examples merely illustrate the invention. Those skilled in the art will recognize many variations that are within the spirit of the invention and scope of the claims.

A. Preparation of Organometallic Complexes

EXAMPLE 1

Preparation of a Dimethylsilyl-bridged Indeno[1,2-b]indolyl Cyclopentadienyl Zirconium Complex (6)

(a) Preparation of Indeno[2-b]indole 1. A mixture of 1-indanone (30.6 g, 232 mmol) and p-tolylhydrazine hydrochloride (37.0 g, 233 mmol) in EtOH (350 mL) and aqueous HCl (12 N, 18 mL) are heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum (36.5 g, 72%).

(b) N-Methylation of 1. A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Anion generation: Preparation of 3. n-Butyllithium (120 mL, 2.5 M, 1.6 mol) is added dropwise to a solution of 2 (43.9 g, 188 mmol) in toluene (560 mL). A precipitate forms after an hour. The mixture is allowed to stand for 48 h and is filtered. The solid is washed with toluene (500 mL), then hexanes (500 mL), and is dried under vacuum (40.3 g, 90%).

(d) Reaction with Dichlorodimethylsilane to give 4. A solution of 3 (23.3 g, 97.4 mmol) in toluene (240 mL) and $Et_2O$ (160 mL) is added to a solution of $SiCl_2Me_2$ (60.0 mL, 495 mmol) in $Et_2O$ (170 mL). The mixture becomes cloudy and is stirred for 48 h and filtered over Celite. Volatiles are removed under vacuum to afford a gray solid (24.8 g, 78%).

(e) Dianion generation. Preparation of 5. Sodium cyclopentadienide (16.0 mL, 2 M, 32.0 mmol) is added to a solution of 4 (9.62 g, 29.5 mmol) in $Et_2O$ (240 mL). A solid forms immediately, and the mixture is maintained at room temperature overnight. The crude mixture is washed with $H_2O$ (100 mL). The organic phase is dried over $Na_2SO_4$ and filtered. Evaporation to dryness gives an oil. The oil is dissolved in $Et_2O$ (250 mL) and cooled to −78° C. n-Butyllithium (28.0 mL, 2.5 M, 70.0 mmol) is added dropwise and the mixture warms slowly to room temperature. Stirring continues for 24 h. A yellow solid forms, the mixture is filtered, and the solid is dried under vacuum (12.3 g, 99%).

(f) Preparation of Zirconium Complex 6.

Dianion 5 (7.94 g, 21.6 mmol) is added as a solid to a solution of $ZrCl_4$ (5.03 g, 21.6 mmol) in toluene (250 mL) and $Et_2O$ (50 mL). The mixture turns orange and is maintained at room temperature for 48 h and then filtered. The solid is washed with toluene (200 mL), then hexanes (50 mL), and is dried under vacuum (4.0 g, 36%).

EXAMPLE 2

Preparation of a Dimethylsilyl-bridged Indeno[1,2-b]indolyl Fluorenyl Zirconium Complex (10)

(a) Preparation of 9-Chlorodimethylsilylfluorene (7). A slurry of fluorene (24.0 g, 144 mmol) in $Et_2O$ (400 mL) is cooled to 0° C., and n-BuLi (90.0 mL, 2.5 M in hexanes, 225 mmol) is added dropwise. The solution turns orange and warms to room temperature overnight. A solution of $SiCl_2Me_2$ (210 mL, 1.73 mol) in $Et_2O$ (100 mL) is cooled to 0° C., and the fluorenyl anion is added dropwise. A precipitate forms immediately, and the mixture is stirred for 24 h and filtered. Volatiles are removed under reduced pressure, and the residue is washed with hexanes (100 mL) and filtered. The white solid is collected and dried under vacuum. A second crop is isolated from the hexanes wash (combined yield: 28.7 g, 77%).

(b) Reaction with 3 to give 8. A solution of 3 (15.3 g, 64.2 mmol) in toluene (250 mL) and $Et_2O$ (100 mL) is added dropwise to a solution of 7 (16.6 g, 64.0 mmol) in $Et_2O$ (100 mL). The mixture is stirred for 48 h and is then washed with $H_2O$ (200 mL). The layers are separated, and the organics are dried over $Na_2SO_4$ and filtered. Volatiles are removed under vacuum, and the residue is washed with hexanes (100 mL) and dried (7.89 g, 27%).

(c) Preparation of Dianion 9. A solution of 8 (7.89 g, 17.3 mmol) in $Et_2O$ (130 mL) is cooled to −78° C., and n-BuLi (15.0 mL, 2.5 M, 37.5 mmol) is added. The mixture is warmed to room temperature and a bright yellow solid forms. The mixture is filtered after 24 h, and the solid is dried under vacuum (9.84 g, 99%).

(d) Preparation of Complex 10. Dianion 9 (3.19 g, 6.82 mmol) is added to a solution of $ZrCl_4$ (1.59 g, 6.82 mmol) in toluene (150 mL) and $Et_2O$ (30 mL). The mixture turns purple and is stirred for 48 h and filtered. The solid is washed with toluene (100 mL) and dried under vacuum (2.75 g, 66%).

EXAMPLE 3

Preparation of a Dimethylsilyl-bridged Indeno[2,1-b]indolyl Cyclopentadienyl Zirconium Complex (15)

(a) Preparation of Indeno[2,1-b]indole 11. A mixture of 2-indanone (51.0 g, 0.39 mol) and p-tolylhydrazine hydrochloride (61.4 g, 0.39 mol) is dissolved in glacial acetic acid (525 mL) and is vigorously stirred and heated to reflux. The mixture turns red and is heated for 2 h. After cooling to room temperature, it is poured into ice water (1 L). The precipitate is filtered to afford a solid, which is washed with water (about 1 L). The solid is dissolved in ethyl acetate (1.4 L), activated charcoal is added, and the mixture is gently warmed. The mixture is then cooled and filtered over a pad of Celite. The filtrate is dried over $Na_2SO_4$, filtered, and is then concentrated to 450 mL and cooled to −30° C. for 3 days. The crystalline solid is filtered and washed with chilled (−78° C.) hexanes (2×500 mL). The beige solid is collected and dried under vacuum (47.1 g, 56%).

(b) N-Methylation of 11 to give 12. A slurry of aqueous NaOH (42 mL, 21.5 M, 903 mmol), $C_{16}H_{33}NMe_3Br$ (0.36 g, 0.97 mmol), and 11 (15.0 g, 68.4 mmol) is combined with toluene (50 mL). A solution of MeI (8.0 mL, 129 mmol) in toluene (15 mL) is added dropwise at room temperature. The mixture is stirred at room temperature for 2.5 h and then refluxed for an hour. The mixture turns red and is cooled to room temperature and filtered. The crystalline solid is washed with chilled (−30° C.) EtOH (200 mL) followed by chilled hexanes (200 mL) to afford a pale red solid (10.3 g, 65%).

(c) Anion generation: Preparation of 13. n-Butyllithium (13.0 mL, 2.5 M in hexanes, 32.5 mmol) is added at room temperature to a slurry of 12 (4.94 g, 21.1 mmol) in toluene (125 mL). The mixture is maintained at room temperature and turns pale yellow. A precipitate forms after 2 h. After 2 days, the mixture is filtered to give a pale beige solid. The solid is washed with toluene (60 mL), followed by hexanes (30 mL), and is then collected and dried under vacuum (4.37 g, 87%).

(d) Preparation of Dianion 14. Product 13 (4.57 g, 19.1 mmol) is suspended in toluene (100 mL). Diethyl ether (40 mL) is added dropwise to afford an orange solution, which is added to a solution of $SiCl_2Me_2$ (12.0 mL, 98.9 mmol) in $Et_2O$ (100 mL) at room temperature. The mixture turns cloudy and dirty beige and is stirred for 3 days and filtered to give a dark red-orange solution. Volatiles are removed under reduced pressure to afford an oily solid. An aliquot is analyzed by $^1H$ NMR, revealing formation of the desired product; 100% conversion is presumed. The oily solid is dissolved in $Et_2O$ (140 mL), and NaCp (11.0 mL, 2.0 M in THF, 22 mmol) is added. A precipitate forms immediately, and stirring continues for 2 days. The mixture is washed with water (3×50 mL), and the organic phase is dried over $Na_2SO_4$ and filtered. Volatiles are removed under vacuum to give an oily residue, and 100% conversion is assumed. The residue was dissolved in $Et_2O$ (75 mL) and cooled to −78° C. n-Butyllithium (18.0 mL, 2.5 M in hexanes, 45.0 mmol) is added by syringe, and the mixture is warmed to room temperature slowly. A yellow solid precipitates overnight, and volatiles are removed under vacuum. The crude material is washed with hexanes (100 mL) and filtered to afford a yellow powder. The powder is collected and dried under vacuum (6.73 g, 93%).

(e) Preparation of Complex 15. Zirconium tetrachloride (3.15 g, 13.5 mmol) is combined with toluene (100 mL) and dissolved in $Et_2O$ (50 mL) to produce a cloudy suspension. Dianion 14 (5.02 g, 13.7 mmol) is added as a solid in portions over the course of 30 min. The color turns from yellow to dark orange, and a precipitate forms. The mixture is maintained at room temperature for 2 days and is filtered to give a dirty yellow solid. The solid is washed with toluene (50 mL) and hexanes (50 mL). The yellow powder is collected and dried under vacuum (3.72 g, 53%).

EXAMPLE 4

Preparation of a Dimethylsilyl-bridged Indeno[2,1-b]indolyl Fluorenyl Zirconium Complex (18)

(a) Preparation of 16. A solution 13 (3.99 g, 16.7 mmol) in toluene (80 mL) and $Et_2O$ (30 mL) is added dropwise to a solution of 7 (4.32 g, 16.7 mmol) in $Et_2O$ (120 mL). The mixture turns cloudy and is stirred for 24 h and filtered. The solid is extracted with $CH_2Cl_2$ and $^1H$ NMR analysis reveals a spectrum consistent with the proposed structure (5.61 g, 67%).

(b) Preparation of Dianion 17. A slurry of 16 (5.58 g, 12.3 mmol) in $Et_2O$ (150 mL) is cooled to −78° C., and n-BuLi (11.0 mL, 2.5 M, 27.5 mmol) is added. The mixture turns yellow-orange and warms to room temperature overnight. Volatiles were removed under vacuum. The residue is washed with hexanes, and the solids are filtered and dried (6.08 g, 99%).

(c) Preparation of Complex 18. A 250-mL flask is charged with $ZrCl_4$ (1.45 g, 6.22 mmol) and toluene (75 mL). Diethyl ether (25 mL) is added slowly to dissolve the Zr compound. The dianion is added in portions over the course of 30 min, and the mixture turns red. Stirring continues for 24 h. The mixture is filtered, and the residue is washed with toluene (30 mL) followed by hexanes (30 mL) to afford a red-orange solid (2.93 g, 67%).

EXAMPLE 5

Preparation of an Isopropylidene-bridged Indeno[1,2-b]indolyl Cyclopentadienyl Zirconium Complex (21)

(a) Neutral propylidene ligand 19. A solution of dimethylfulvene (10.8 mL, 89.6 mmol) in THF (60 mL) is added to a solution of 3 (20.0 g, 85.9 mmol) in THF (180 mL). The mixture is refluxed for 2 h, cooled to room temperature, and then quenched with $H_2O$ (300 mL). The aqueous layer is washed with $CH_2Cl_2$ (300 mL), and the organic phase is separated, dried over $Na_2SO_4$ and filtered. Volatiles are concentrated to 60 mL and hexanes (150 mL) are added. The mixture is filtered, washed with hexanes (50 mL), and dried under vacuum (20.3 g, 59%).

(b) Dianion 20. n-Butyllithium (8.0 mL, 2.5 M, 20 mmol) is added to a slurry of 19 (3.26 g, 9.61 mmol) at −78° C., and the mixture warms to room temperature overnight. The solid is filtered and dried (2.74 g, 81 %).

(c) Preparation of Complex 21. Dianion 20 (0.40 g, 1.14 mmol) is added to a solution of $ZrCl_4$ (0.26 g, 1.11 mmol) in toluene (8 mL) and $Et_2O$ (40 mL). The mixture is maintained at room temperature overnight and is then filtered. The solid is dried under vacuum (0.43 g, 66%).

COMPARATIVE EXAMPLE 6

Preparation of a Non-bridged Indeno[1,2-b]indolyl Cyclopentadienyl Zirconium Complex (22)

A 250-mL flask equipped with stir bar is charged with 3 (10.0 g, 42.0 mmol) and toluene (95 mL) to make an orange slurry. Diethyl ether (35 mL) is added slowly to afford a dark orange solution. This solution is added over the course of 15 minutes at room temperature to a slurry of $(C_5H_5)ZrCl_3$ (11.1 g, 42.0 mmol) in toluene (190 mL) and $Et_2O$ (190 mL) under vigorous stirring. The mixture turns deep red and is maintained at room temperature overnight. The slurry is filtered, and the red solid is collected and dried under vacuum (16.5 g, 78%).

B. Preparation of Supported Complexes

EXAMPLE 7

Silica-supported $Me_2Si$-bridged Indeno[1,2-b] indolyl Cp Complex

Silica (Davison 948) is calcined for 4 h at 250° C. (this silica is used in each of Examples 7-11). Methylalumoxane (1.2 mL of 4.21 M solution of MAO in toluene, product of Albemarle) is added to a 4.0-g sample of the calcined silica, and the mixture is stirred for 10 min. Zirconium complex 6 from Example 1 (40 mg) and tris(pentafluorophenyl)borane ("F15," 99 mg) are dissolved in more of the MAO solution (2.5 mL), and this mixture is added to the pretreated silica. Removal of volatiles gives a green, free-flowing powder having an Al/Zr molar ratio of 233.

EXAMPLE 8

Silica-supported $Me_2Si$-bridged Indeno[1,2-b] indolyl Flu Complex

Methylalumoxane (0.5 mL of 4.21 M solution of MAO in toluene) is added to a 2.0-g sample of calcined silica, and the mixture is stirred for 10 min. Zirconium complex 10 from Example 2 (20 mg) and tris(pentafluorophenyl)borane (42 mg) are dissolved in more of the MAO solution (0.90 mL), and this mixture is added to the pretreated silica. Removal of volatiles gives a green, free-flowing powder having an Al/Zr molar ratio of 200.

EXAMPLE 9

Silica-supported $Me_2C$-bridged Indeno[1,2-b] indolyl Cp Complex

Methylalumoxane (0.7 mL of 4.21 M solution of MAO in toluene) is added to a 2.0-g sample of calcined silica, and the mixture is stirred for is 10 min. Zirconium complex 21 from Example 5 (20 mg) and tris(pentafluorophenyl)borane (56 mg) are dissolved in more of the MAO solution (1.4 mL), and this mixture is added to the pretreated silica. Removal of volatiles gives a green, free-flowing powder having an Al/Zr molar ratio of 200.

EXAMPLE 10

Silica-supported $Me_2Si$-bridged Indeno[2,1-b] indolyl Cp Complex

Methylalumoxane (0.6 mL of 4.21 M solution of MAO in toluene) is added to a 2.0-g sample of calcined silica, and the mixture is stirred for 10 min. Zirconium complex 15 from Example 3 (20 mg) and tris(pentafluorophenyl)borane (43 mg) are dissolved in more of the MAO solution (1.0 mL), and this mixture is added to the pretreated silica. Removal of volatiles gives a deep-red, free-flowing powder having an Al/Zr molar ratio of 200.

EXAMPLE 11

Silica-supported $Me_2Si$-bridged Indeno[2,1-b] indolyl Flu Complex

Methylalumoxane (0.45 mL of 4.21 M solution of MAO in toluene) is added to a 2.0-g sample of calcined silica, and the mixture is stirred for 10 min. Zirconium complex 18 from Example 4 (20 mg) and tris(pentafluorophenyl)borane (37 mg) are dissolved in more of the MAO solution (0.90 mL), and this mixture is added to the pretreated silica. Removal of volatiles gives a green, free-flowing powder having an Al/Zr molar ratio of 200.

EXAMPLE 12

Silica-supported $Me_2Si$-bridged Indeno[2,1-b] indolyl Cp Complex (No F15 present)

Silica (Crossfield ES 757) is calcined at 250° C. for 12 h. In a glove box at room temperature, methylalumoxane (0.8 mL of 30 wt. % MAO in toluene) is slowly added to a 1.0-g sample of the calcined silica with efficient stirring. After MAO addition is complete, the mixture is stirred for 0.5 h, and volatile material is stripped under vacuum at room temperature (about 1 hour). About 1.25 g of MAO-treated silica is obtained. Still in the glovebox, more of the MAO solution (1.18 mL) is added to a sample of Complex 15 from Example 3 (0.11 mmol) to form a solution. This solution is then added slowly to the MAO-treated silica. After about 0.5 h of mixing at room temperature, volatiles are removed to give the silica-supported catalyst (about 1.75 g) having an Al/Zr molar ratio of 80.

COMPARATIVE EXAMPLE 13

Silica-supported Non-bridged Indeno[1,2-b]indolyl Cp Complex

The procedure of Example 12 is followed, except that Complex 22 from Comparative Example 6 is used. A total of about 1.75 g of silica-supported catalyst is obtained.

C. Ethylene Copolymerizations with 1-Hexene

EXAMPLE 14

A two-liter, stainless-steel reactor is charged with isobutane (900 mL), 1-hexene (100 mL), triisobutylaluminum (0.8 mL of 1.0 M solution in hexane) and hydrogen (measured as a 100-psig pressure drop from a 7-mL vessel). The reactor is pressurized with ethylene to 370 psig, and the contents are heated to 80° C. A sample of silica-supported [1,2-b] complex from Example 7 (0.17 g) is injected into the reactor to start the polymerization. Ethylene is supplied on demand to keep the reactor pressure at 370 psig. After 30 min., the reactor is vented to recover 35.6 g of polyethylene having $MI_2$=3.6, Mw/Mn=3.64, density=0.913 g/cm³, and LCBI=0.03.

EXAMPLE 15

A two-liter, stainless-steel reactor is charged with isobutane (900 mL), 1-hexene (110 mL), triisobutylaluminum (0.4 mL of 1.0 M solution in hexane) and hydrogen (measured as a 250-psig pressure drop from a 7-mL vessel). The reactor is pressurized with ethylene to 320 psig, and the contents are heated to 70° C. A sample of silica-supported [1,2-b] complex from Example 7 (0.17 g) is injected into the reactor to start the polymerization. Ethylene is supplied on demand to keep the reactor pressure at 320 psig. After 30 min., the reactor is vented to recover 33.3 g of polyethylene having $MI_2$=1.9, Mw/Mn=4.10, density=0.911 g/cm³, and LCBI=0.04.

Examples 14 and 15 demonstrate that bridged indeno[1, 2-b]indolyl complexes provide efficient comonomer incorporation to give ethylene copolymers with low density and little or no long-chain branching.

EXAMPLE 16

The procedure of Example 15 is followed, except that triethylaluminum is used instead of triisobutylaluminum. Venting the reactor gives 33.3 g of polyethylene having $MI_2=5.7$, Mw/Mn=2.66, density=0.907 g/cm$^3$, and LCBI=0.

This example shows the ability of triethylaluminum to narrow the polymer molecular weight distribution.

EXAMPLE 17

A two-liter, stainless-steel reactor is charged with isobutane (900 mL), 1-hexene (75 mL), triisobutylaluminum (0.33 mL of 1.0 M solution in hexane) and hydrogen (measured as a 100-psig pressure drop from a 7-mL vessel). The reactor is pressurized with ethylene to 350 psig, and the contents are heated to 70° C. A sample of silica-supported [2,1-b] complex from Example 10 (80 mg) is injected into the reactor to start the polymerization. Ethylene is supplied on demand to keep the reactor pressure at 350 psig. After 30 min., the reactor is vented to recover 54.1 g of polyethylene having $MI_2=1.1$, Mw/Mn=3.51, density=0.918 g/cm$^3$, and LCBI=1.5.

EXAMPLE 18

The procedure of Example 17 is followed, except that 100 mL of 1-hexene is used. After 30 min., the reactor is vented to recover 44.7 g of polyethylene having $MI_2=0.43$, Mw/Mn=2.73, density=0.901 g/cm$^3$, and LCBI=3.6.

Examples 17 and 18 show that bridged, indeno[2,1-b]indolyl complexes are valuable for making very low density polyethylenes having narrow molecular weight distributions and substantial long-chain branching. These examples also demonstrate the exceptional efficiency of the [2,1-b] complex for incorporating comonomer.

EXAMPLE 19

A two-liter, stainless-steel reactor is charged with isobutane (900 mL), 1-hexene (100 mL), triisobutylaluminum (0.65 mL of 1.0 M solution in hexane) and hydrogen (measured as a 200-psig pressure drop from a 7-mL vessel). The reactor is pressurized with ethylene to 350 psig, and the contents are heated to 70° C. A sample of silica-supported fluroenyl [1,2-b] complex from Example 8 (0.36 g) is injected into the reactor to start the polymerization. Ethylene is supplied on demand to keep the reactor pressure at 350 psig. After 30 min., the reactor is vented to recover 83.7 g of polyethylene having $MI_2<0.01$, Mw=710,000, Mw/Mn=7.20, and density=0.891 g/cm$^3$.

EXAMPLE 20

A two-liter, stainless-steel reactor is charged with isobutane (900 mL), 1-hexene (100 mL), triisobutylaluminum (0.65 mL of 1.0 M solution in hexane) and hydrogen (measured as a 300-psig pressure drop from a 7-mL vessel). The reactor is pressurized with ethylene to 350 psig, and the contents are heated to 70° C. A sample of silica-supported fluroenyl [2,1-b] complex from Example 11 (0.57 g) is injected into the reactor to start the polymerization. Ethylene is supplied on demand to keep the reactor pressure at 350 psig. After 30 min., the reactor is vented to recover 12.6 g of polyethylene having $MI_2<0.01$, Mw=220,000, Mw/Mn=6.11, and density=0.901 g/cm$^3$.

Examples 19 and 20 illustrate that ability of fluorenyl indeno[1,2-b]indolyl and flurorenyl indeno[2,1-b]indolyl complexes to make very low density, "ultra-high" molecular weight (UHMW) polyethylenes, i.e., polyethylenes having Mw>200,000.

EXAMPLE 21

A two-liter, stainless-steel reactor is charged with isobutane (900 mL), 1-hexene (100 mL), triisobutylaluminum (0.44 mL of 1.0 M solution in hexane) and hydrogen (measured as a 300-psig pressure drop from a 7-mL vessel). The reactor is pressurized with ethylene to 350 psig, and the contents are heated to 70° C. A sample of silica-supported isopropylidene [1,2-b] complex from Example 9 (0.17 g) is injected into the reactor to start the polymerization. Ethylene is supplied on demand to keep the reactor pressure at 350 psig. After 30 min., the reactor is vented to recover 31.3 g of polyethylene having $MI_2=1.4$, Mw/Mn=2.66, density=0.908 g/cm$^3$, and LCBI=0.29.

This example demonstrates the ability of an isopropylidene-bridged indeno[1,2-b]indolyl complex to make polyethylenes with narrow molecular weight distributions.

D. Versatility of Indeno[2,1-b]indolyl Complexes

EXAMPLE 22

Preparation of LLDPE having Long-chain Branching

A one-liter, stainless-steel reactor is charged with 1-hexene (35 mL) and hydrogen (15-psig pressure drop from an 80-mL vessel). Armostat® 710 fatty amine (1 mg, product of Akzo Nobel) in heptane (0.25 mL) and triisobutylaluminum (1.0 mL of 1.0 M solution in heptane) are mixed in one sidearm of an injector. The mixture is then flushed into the reactor using nitrogen pressure and isobutane (about 450 mL). The reactor is pressurized with ethylene to 320 psig, and the reactor contents are equilibrated at 80° C. Supported catalyst from Example 12 (30 mg) is flushed into the reactor with more isobutane (100 mL) and nitrogen pressure from the other sidearm of the injector. Ethylene is supplied on demand to maintain the reactor pressure at 320 psig. After 30 min., the reactor is vented, and the resulting linear low density polyethylene (84.8 g) is dried under vacuum at 60° C. $MI_2=0.5$; Mw/Mn=3.1; density=0.913 g/cm$^3$; LCBI=1.7.

EXAMPLE 23

Preparation of HDPE having Long-chain Branching

The one-liter reactor from Example 22 is used. One sidearm of the injector is charged with Armostat 710 fatty amine (1 mg) in heptane (0.25 mL) and triisobutylaluminum (1.0 mL of 1.0 M solution in heptane). This mixture is flushed into the reactor with isobutane (about 375 mL) and nitrogen pressure. The reactor is pressurized with ethylene to 450 psig, and the reactor contents are equilibrated at 80° C. Supported catalyst from Example 12 (36 mg) is flushed into the reactor with more isobutane (100 mL) and nitrogen pressure from the other sidearm of the injector. Ethylene is supplied on demand to maintain the reactor pressure at 450 psig. After 30 min., the reactor is vented, and the resulting high-density polyethylene (53.8 g) is dried under vacuum at 60° C. Mw/Mn=3.6; density=0.947 g/cm$^3$; LCBI>2.

EXAMPLE 24

Preparation of Ethylene-Hexene Plastomer Having LCB

The one-liter reactor is charged with 1-hexene (75 mL) and hydrogen (20-psig pressure drop from an 80-mL vessel).

One sidearm of the injector is charged with Armostat 710 fatty amine (1 mg) in heptane (0.25 mL) and triisobutylaluminum (1.0 mL of 1.0 M solution in heptane). This mixture is flushed into the reactor with isobutane (about 325 mL) and nitrogen pressure. The reactor is pressurized with ethylene to 350 psig, and the reactor contents are equilibrated at 80° C. Supported catalyst from Example 12 (29 mg) is flushed into the reactor with more isobutane (100 mL) and nitrogen pressure from the other sidearm of the injector. Ethylene is supplied on demand to maintain the reactor pressure at 350 psig. After 30 min., the reactor is vented, and the resulting plastomeric ethylene-hexene copolymer (62.7 g) is dried under vacuum at 60° C. $MI_2$=0.64; Mw/Mn=3.6; density=0.895 g/cm$^3$; LCBI=0.7.

COMPARATIVE EXAMPLE 25

The procedure of Example 22 is followed, except that the silica-supported complex prepared in Comparative Example 13 is used. The resulting polyethylene has $MI_2$=2.0; Mw/Mn=2.8; density=0.932 g/cm$^3$; LCBI=0.

Examples 22–24 demonstrate the versatility of dimethylsilyl-bridged indeno[2,1-b]indolyl complexes for making polyolefins having long-chain branching. The catalyst gives HDPE, LLDPE, and plastomers (density range 0.895 to 0.947 g/cm$^3$), all having significant levels of long-chain branching (LCBI>0.5). In contrast, an unbridged indeno[1,2-b]indolyl Cp complex gave a polyethylene having higher density and no measurable amount of long-chain branching (see Comparative Example 25).

EXAMPLE 26

UHMW Ethylene-Butene Plastomer

A two-liter, stainless-steel reactor is charged with isobutane (1000 mL), 1-hexene (100 mL), and triisobutylaluminum (0.44 mL of 1.0 M solution in hexane). The reactor is pressurized with ethylene to 350 psig, and the contents are heated to 70° C. An organometallic complex is prepared as in Example 5, except that diphenylfulvene is used in place of dimethylfulvene. The complex is supported on MAO-treated silica as described earlier (see Example 9) to give a powder having an Al/Zr molar ratio of 200. The silica-supported, Ph$_2$C-bridged indeno[1,2-b]indolyl cyclopentadienylzirconium dichloride complex (0.2 g) is injected into the reactor to start the polymerization. Ethylene is supplied on demand to keep the reactor pressure at 350 psig. After 30 min., the reactor is vented to recover polyethylene having Mn=153,000, Mw=459,000, Mw/Mn=3.0, and density=0.903 g/cm$^3$.

E. Pilot-Scale Slurry-Loop Polymerizations

EXAMPLE 27

The procedure of Example 7 is generally followed on a larger scale to make about 10 pounds of silica-supported [1,2-b] catalyst. An incipient-wetness technique is used both to treat the silica with MAO solution (about 1 hour), and to apply the solution of MAO/F15/organometallic complex to the treated silica (about 3 hours). Toluene is not stripped from the free-flowing solid. This catalyst is then tested in a 44-gallon loop reactor using isobutane as a diluent. Conditions: 170° F.; hexene/ethylene molar ratio: 0.37; hexene feed ratio (lb./lb. ethylene): 0.28; hydrogen feed rate (pph) 0.0050; triethylaluminum (ppm): 50; residence time (h): 0.8. Polymer properties: $MI_2$=0.6; MIR ($I_{20}/I_2$)=27.6; density= 0.911 g/cm$^3$; bulk density=28.4 lb/ft$^3$; residual Zr (ppm)= 0.7.

EXAMPLE 28

The catalyst used in Example 27 is again tested, under somewhat modified conditions, in the 44-gallon loop reactor using isobutane as a diluent. Conditions: 170° F.; hexene/ethylene molar ratio: 0.42; hexene feed ratio (lb./lb. ethylene): 0.32; hydrogen feed rate (pph): 0.0037; triethylaluminum (ppm): 200; residence time (h): 0.7. Polymer properties: $MI_2$=1.7; MIR ($I_{20}/I_2$)=21; density=0.912 g/cm$^3$; bulk density=26.1 lb/ft$^3$; residual Zr (ppm)=0.4.

EXAMPLE 29

Lab-scale Catalyst Preparation

A silica-supported catalyst is prepared as follows. Silica (Crossfield ES 757) is calcined at 250° C. for 12 h. In a glove box at room temperature, methylalumoxane (3.45 mL of 30 wt. % MAO in toluene) is slowly added to a 4.3-g sample of the calcined silica with efficient stirring. After MAO addition is complete, the mixture is stirred for 1 h, and volatile material is stripped under vacuum at room temperature (about 1 hour). About 5.6 g of MAO-treated silica is obtained. Still in the glovebox, more of the MAO solution (4.8 mL) is added to a sample of Complex 15 from Example 3 (0.235 mmol) to form a solution. This solution is then added slowly to the MAO-treated silica. After about 1 h of mixing at room temperature to give 10.3 gram catalyst of free-flowing powder having an Al/Zr molar ratio of about 140.

EXAMPLE 30

The procedure of Example 29 is generally followed on a larger scale to make about 6 pounds of silica-supported [2,1-b] catalyst. An incipient-wetness technique is used both to treat the silica with MAO solution (about 1 hour), and to apply the solution of MAO/organometallic complex to the treated silica (about 3 hours). The supported catalyst is tested in the 44-gallon loop reactor, again using isobutane. Conditions: 170° F.; hexene/ethylene molar ratio: 0.28; hexene feed ratio (lb./lb. ethylene): 0.30; hydrogen feed rate (pph): 0.0026; triethylaluminum (ppm): 0; residence time (h): 0.85; Polymer properties: $MI_2$=1.5; MIR ($I_{20}/I_2$)=29; density=0.911 g/cm$^3$; bulk density=23.5 lb/ft$^3$; residual Zr (ppm)=0.1.

Examples 27–30 demonstrate that the silica-supported, silyl-bridged indeno[1,2-b]indolyl and indeno[2,1-b]indolyl complexes are valuable for making ethylene-hexene copolymers of very low density in a process that approximates commercial conditions. Comonomer incorporation is efficient and hydrogen response is good, particularly for the [2,1-b] complex (compare Examples 27 and 30).

The preceding examples are meant only as illustrations. The following claims define the invention.

Organometallic Complexes Used in the Examples
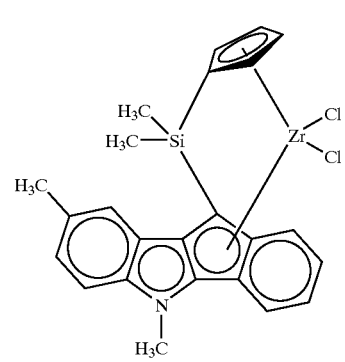
Me₂Si-bridged [1,2-b] Cp
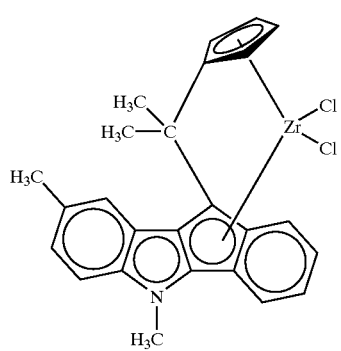
Me₂C-bridged [1,2-b] Cp
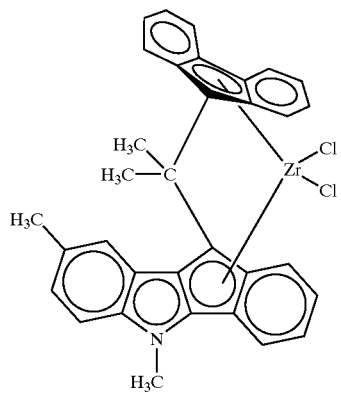
Me₂Si-bridged [1,2-b] Flu
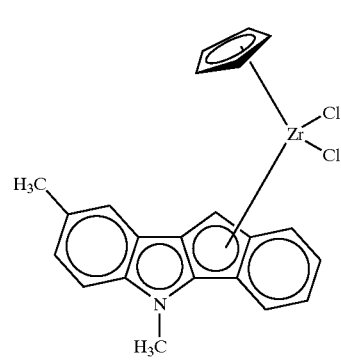
Non-bridged [1,2-b] Cp
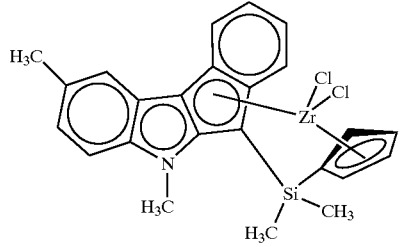
Me₂Si-bridged [2,1-b] Cp
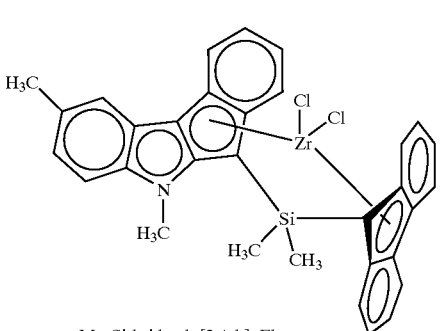
Me₂Si-bridged [2,1-b] Flu
TABLE 1
Summary of Polymerization Conditions
| Polym. Ex. # | Cat. Ex. # | Indenoindolyl Zr Complex | Silica treat | Al:Zr (mol/mol) | H₂ (dpsi) | 1-hexene (mL) | Temp (° C.) | R₃Al scavenger | C2 (psig) |
|---|---|---|---|---|---|---|---|---|---|
| 14 | 7 | Me₂Si [1,2-b] Cp | MAO/F15 | 233 | 100 | 100 | 80 | TIBAL | 370 |
| 15 | 7 | Me₂Si [1,2-b] Cp | MAO/F15 | 233 | 250 | 110 | 70 | TIBAL | 320 |

TABLE 1-continued

Summary of Polymerization Conditions

| Polym. Ex. # | Cat. Ex. # | Indenoindolyl Zr Complex | Silica treat | Al:Zr (mol/mol) | H$_2$ (dpsi) | 1-hexene (mL) | Temp (° C.) | R$_3$Al scavenger | C2 (psig) |
|---|---|---|---|---|---|---|---|---|---|
| 16 | 7  | Me$_2$Si [1,2-b] Cp  | MAO/F15 | 233 | 250 | 110 | 70 | TEAL  | 320 |
| 17 | 10 | Me$_2$Si [2,1-b] Cp  | MAO/F15 | 200 | 100 | 75  | 70 | TIBAL | 350 |
| 18 | 10 | Me$_2$Si [2,1-b] Cp  | MAO/F15 | 200 | 100 | 100 | 70 | TIBAL | 350 |
| 19 | 8  | Me$_2$Si [1,2-b] Flu | MAO/F15 | 200 | 200 | 100 | 70 | TIBAL | 350 |
| 20 | 11 | Me$_2$Si [2,1-b] Flu | MAO/F15 | 200 | 300 | 100 | 70 | TIBAL | 350 |
| 21 | 9  | Me$_2$C [1,2-b] Cp   | MAO/F15 | 200 | 300 | 100 | 70 | TIBAL | 350 |

All polymerizations performed in a 2-liter, stainless-steel reactor with 900 mL isobutane.

TABLE 2

Summary of Polymer Properties

| Polym. Ex. # | Cat. Ex. # | Indenoindolyl Zr Complex | PE (g) | MI$_2$ | Mw/Mn | Mw | density (g/cm$^3$) | LCBI | Notes |
|---|---|---|---|---|---|---|---|---|---|
| 14 | 7  | Me$_2$Si [1,2-b] Cp  | 35.6 | 3.6   | 3.64 | 79,200  | 0.913 | 0.03 | No LCB |
| 15 | 7  | Me$_2$Si [1,2-b] Cp  | 33.3 | 1.9   | 4.10 | 90,700  | 0.911 | 0.04 | No LCB |
| 16 | 7  | Me$_2$Si [1,2-b] Cp  | 33.3 | 5.7   | 2.66 | 81,100  | 0.907 | 0    | No LCB, Narrow MWD |
| 17 | 10 | Me$_2$Si [2,1-b] Cp  | 54.1 | 1.1   | 3.51 | 89,900  | 0.918 | 1.5  | LCB |
| 18 | 10 | Me$_2$Si [2,1-b] Cp  | 44.7 | 0.43  | 2.73 | 106,000 | 0.901 | 3.6  | LCB |
| 19 | 8  | Me$_2$Si [1,2-b] Flu | 83.7 | <0.01 | 7.20 | 710,000 | 0.891 | —    | UHMW |
| 20 | 11 | Me$_2$Si [2,1-b] Flu | 12.6 | <0.01 | 6.11 | 222,000 | 0.901 | —    | UHMW |
| 21 | 9  | Me$_2$C [1,2-b] Cp   | 31.3 | 1.4   | 2.66 | 94,200  | 0.908 | 0.29 | Narrow MWD |

We claim:

1. A method which comprises copolymerizing ethylene and a 1-olefin in the presence of a catalyst system comprising (a) an aluminum-containing activator; (b) a bridged, indenoindolyl Group 3–10 transition metal complex; and (c) an alumoxane-treated silica support, to produce a linear low density or plastomeric ethylene copolymer having a density less than 0.930 g/cm$^3$, wherein the catalyst system has an aluminum:transition metal [Al:M] mole ratio less than 500.

2. The method of claim 1 wherein the complex includes a Group 4–6 transition metal.

3. The method of claim 1 wherein the complex includes an indeno[2,1-b]indolyl ligand.

4. The method of claim 1 wherein the complex includes an indeno[1 2-b]indolyl ligand.

5. The method of claim 1 wherein the complex incorporates a bridging group selected from the group consisting of methylene, dimethylene, isopropylidene, and dimethylsilyl.

6. The method of claim 1 wherein an indenoindolyl ligand of the complex is covalently bridged to a polymerization-stable ligand selected from the group consisting of cyclopentadienyl, indenyl, and fluorenyl.

7. The method of claim 1 wherein the activator is methylalumoxane or a mixture of methylalumoxane and an organoborane.

8. The method of claim 7 wherein the organoborane is tris-(pentafluorophenyl)borane.

9. The method of claim 1 wherein the [Al:M] mole ratio is less than about 250.

10. The method of claim 1 wherein the 1-olefin is selected from the group consisting of propylene, 1-butene, 1-hexene, 1-octene, and mixtures thereof.

11. The method of claim 1 wherein the ethylene copolymer has a density less than 0.920 g/cm$^3$.

12. The method of claim 1 wherein the ethylene copolymer has a density less than 0.910 g/cm$^3$.

13. The method of claim 1 wherein the ethylene copolymer has a density less than 0.900 g/cm$^3$.

14. The method of claim 1 wherein the ethylene copolymer has a Mw/Mn<4.0.

15. The method of claim 1 performed in the presence of a chain-transfer agent selected from the group consisting of hydrogen, organozinc compounds, and organoaluminum compounds, to produce a copolymer having Mw<150,000.

16. The method of claim 15 wherein the chain-transfer agent is triethylaluminum in combination with hydrogen, and the copolymer has a Mw/Mn<3.5.

17. The method of claim 1 performed in the absence of a chain-transfer agent to produce a copolymer having Mw>400,000.

18. The method of claim 1 wherein the complex incorporates a fluorenyl ligand, and the resulting copolymer has a Mw>200,000.

19. A method which comprises polymerizing ethylene and optionally a 1-olefin in the presence of a catalyst system comprising (a) an aluminum-containing activator; (b) a bridged, indeno[2,1-b]indolyl Group 3–10 transition metal complex; and (c) an alumoxane-treated silica support, to produce an ethylene polymer or copolymer having a long-chain-branching index>0.2, wherein the catalyst system has an aluminum:transition metal [Al:M] mole ratio less than 500.

20. The method of claim 19 wherein the complex incorporates a bridging group selected from the group consisting of methylene, dimethylene, isopropylidene, and dimethylsilyl.

21. The method of claim 19 wherein an indeno[2,1-b]indolyl ligand of the complex is covalently bridged to a polymerization-stable ligand selected from the group consisting of cyclopentadienyl, indenyl, and fluorenyl.

22. The method of claim 19 wherein the [Al:M] mole ratio is less than about 250.

23. The method of claim 19 wherein the polymer or copolymer has a long-chain-branching index>0.5.

24. The method of claim 19 wherein the polymer or copolymer has a long-chain-branching index>1.0.

25. The method of claim 19 wherein the polymer or copolymer has a Mw/Mn<4.0.

26. The method of claim 19 wherein the 1-olefin is selected from the group consisting of propylene, 1-butene, 1-hexene, 1-octene, and mixtures thereof.

27. The method of claim 26 wherein the copolymer is plastomeric and has a density less than 0.915 g/cm$^3$.

28. The method of claim 27 wherein the copolymer has a density less than 0.900 g/cm$^3$.

29. The method of claim 19 wherein the transition metal complex incorporates a dimethylsilyl bridging group, the 1-olefin is 1-hexene, the mole ratio of 1-hexene to ethylene is at least about 0.3, and the resulting copolymer has a long-chain-branching index>1.0.

* * * * *